United States Patent [19]

Tsujihara et al.

[11] Patent Number: 5,504,538
[45] Date of Patent: Apr. 2, 1996

[54] VIDEO SIGNAL PROCESSOR FOR CONTROLLING THE BRIGHTNESS AND CONTRAST OF A DISPLAY DEVICE

[75] Inventors: Susumu Tsujihara, Neyagawa; Ikunori Inoue, Takatsuki, both of Japan

[73] Assignee: Matsushita Electric Industrial Co., Ltd., Kadoma, Japan

[21] Appl. No.: 364,853

[22] Filed: Dec. 27, 1994

Related U.S. Application Data

[63] Continuation of Ser. No. 89,784, Jul. 9, 1993, abandoned.

[30] Foreign Application Priority Data

Sep. 1, 1992 [JP] Japan ................................. 4-233389
Oct. 9, 1992 [JP] Japan ................................. 4-271337

[51] Int. Cl.⁶ .............................. H04N 5/59; H04N 5/18
[52] U.S. Cl. ........................................... 348/673; 348/694
[58] Field of Search ..................... 348/673, 678, 348/679, 682–685, 687, 689–697; H04N 5/57, 5/59, 5/14, 5/18, 5/16, 5/22

[56] References Cited

U.S. PATENT DOCUMENTS

| | | | |
|---|---|---|---|
| 3,873,767 | 3/1975 | Okada et al. | 358/168 |
| 4,135,200 | 1/1979 | Shanley, II | 358/168 X |
| 4,598,316 | 7/1986 | Rogers, III | 358/168 |
| 4,642,690 | 2/1987 | Hinn | 358/169 |
| 4,682,231 | 7/1987 | Yamakawa | 358/168 |
| 4,797,744 | 1/1989 | Klemmer et al. | 358/168 X |
| 4,945,414 | 7/1990 | Gurley et al. | 358/168 |
| 4,982,287 | 1/1991 | Lagoni | 358/168 |
| 5,079,623 | 1/1992 | Sendelweck et al. | 358/169 X |
| 5,185,656 | 2/1993 | Yamamoto | 358/171 X |

FOREIGN PATENT DOCUMENTS

| | | | |
|---|---|---|---|
| 55-141870 | 11/1980 | Japan | H04N 5/48 |
| 55-143891 | 11/1980 | Japan | H04N 9/535 |
| 61-6985 | 1/1986 | Japan | H04N 5/57 |
| 0187472 | 8/1986 | Japan | H04N 5/59 |
| 62-38088 | 2/1987 | Japan | H04N 5/74 |
| 62-48891 | 3/1987 | Japan | H04N 9/73 |
| 2-60111 | 12/1990 | Japan | H04N 5/16 |

*Primary Examiner*—James J. Groody
*Assistant Examiner*—John W. Miller
*Attorney, Agent, or Firm*—Ratner & Prestia

[57] ABSTRACT

A video signal processor for controlling a displayed image on a CRT having a cathode electrode and a grid electrode includes a generator for generating a brightness reference signal, an adder for adding the brightness reference signal to a black level in a blanking period of an input video signal. The added brightness reference signal is applied to the cathode electrode though a current detector for detecting a current of the added brightness reference signal. A current level signal produced from the current detector is used for determining and clamping the peak of a control voltage applied to the grid electrode such that a voltage difference between a peak of the added brightness reference signal and the peak of the control voltage is maintained constant.

3 Claims, 15 Drawing Sheets

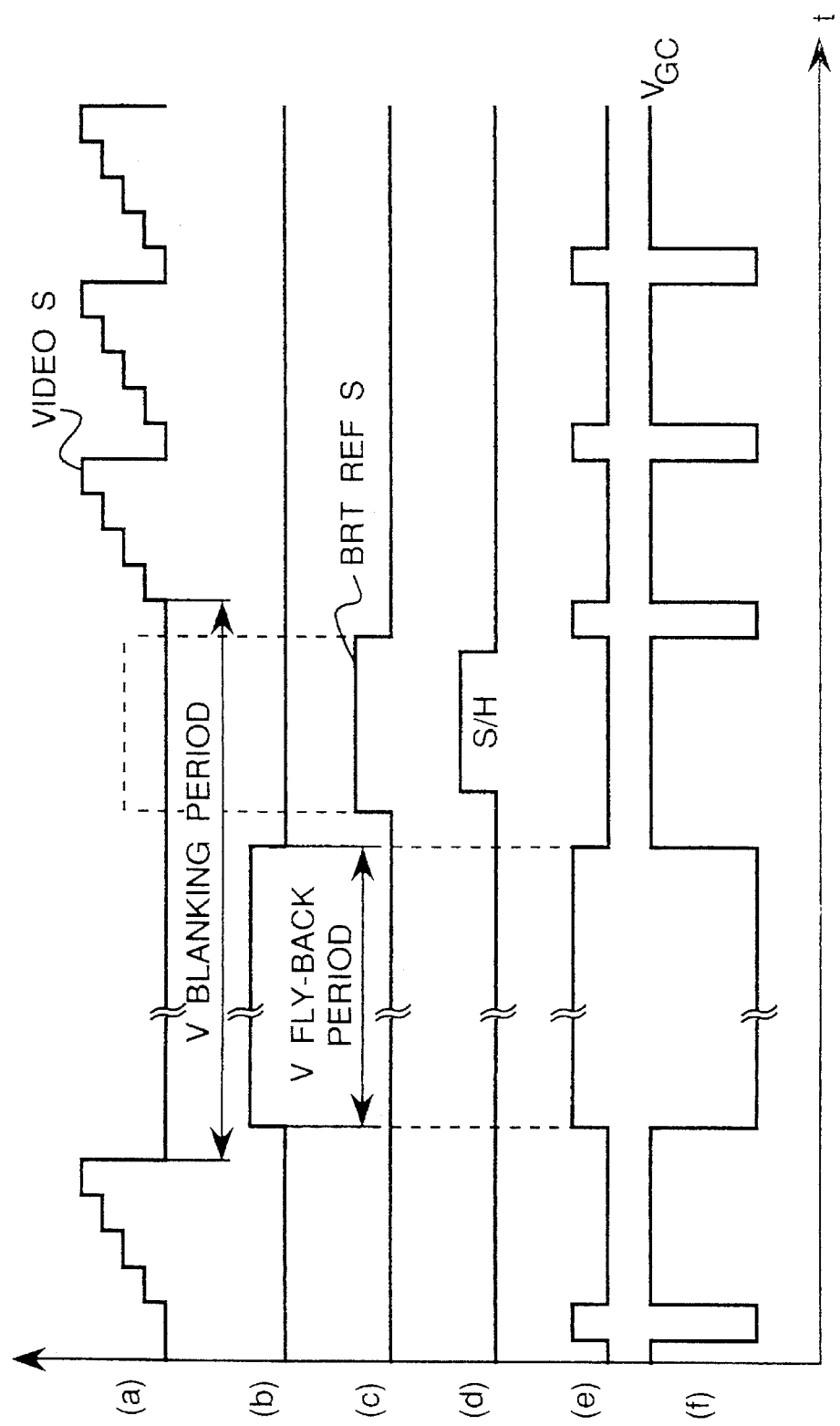

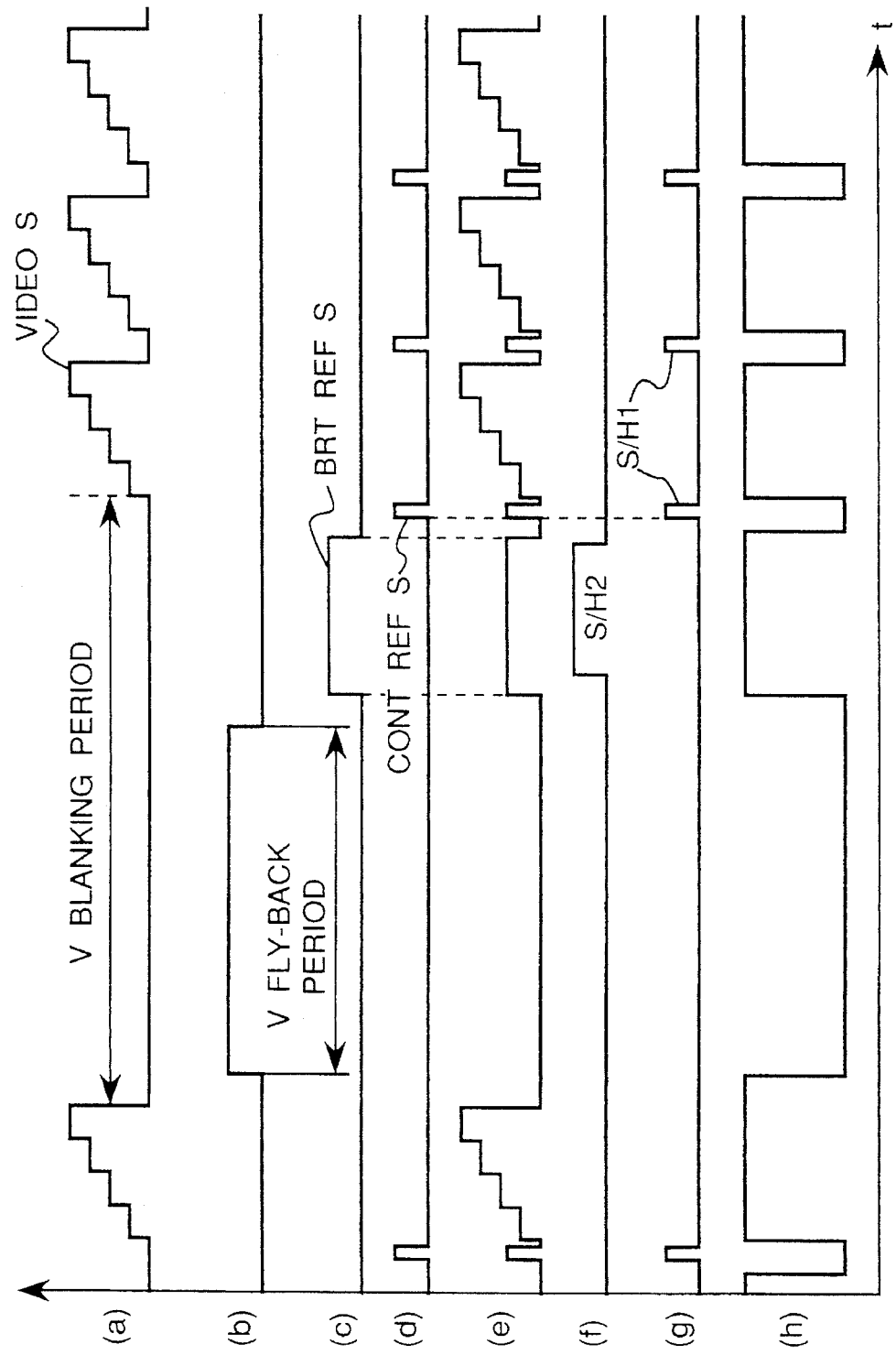

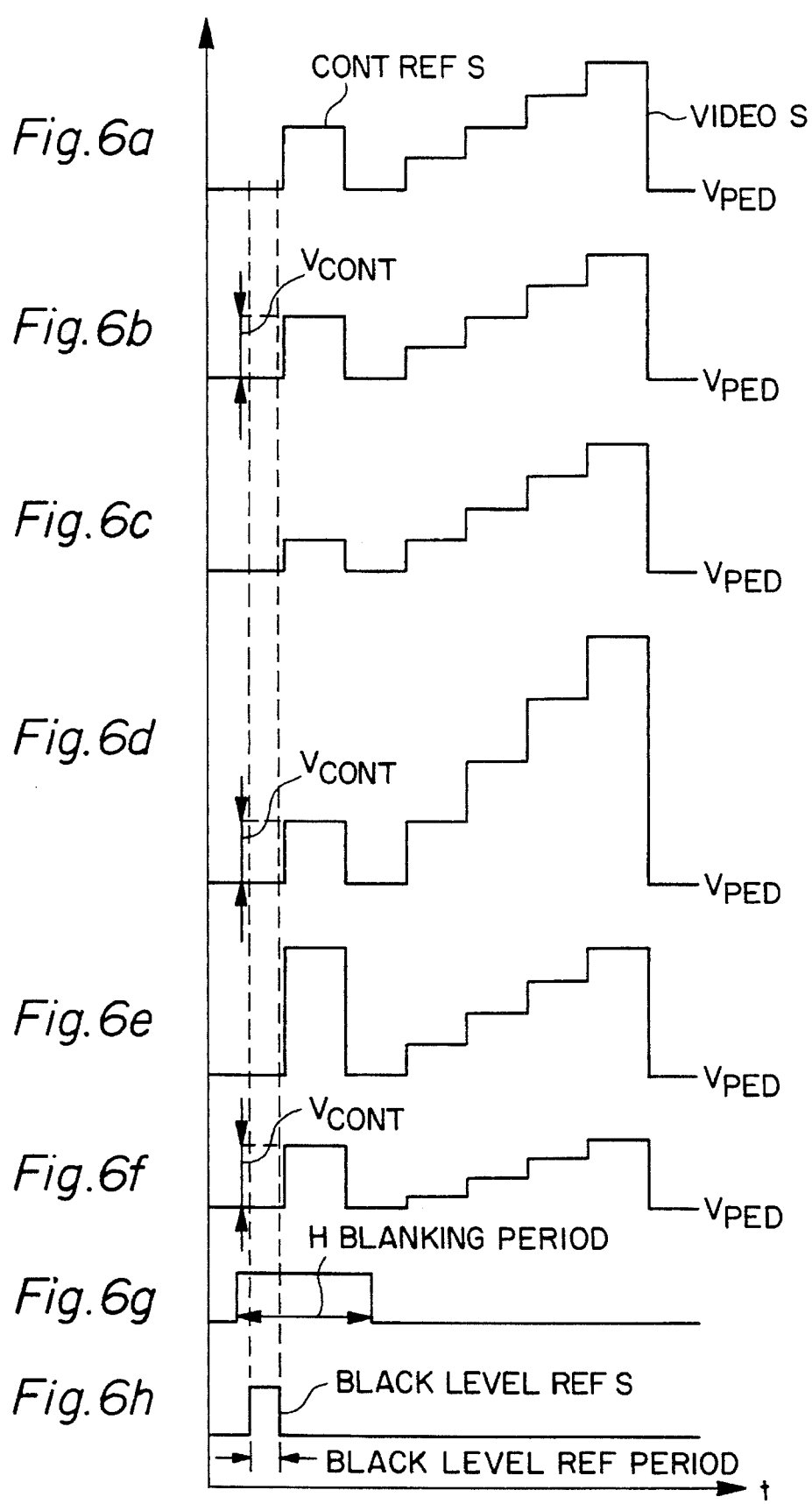

5,504,538

VIDEO SIGNAL PROCESSOR FOR CONTROLLING THE BRIGHTNESS AND CONTRAST OF A DISPLAY DEVICE

This application is a continuation of application Ser. No. 08/089,784 filed Jul. 9, 1993 now abandoned.

BACKGROUND OF THE INVENTION

1. Field of the invention

The present invention relates to a video signal processing apparatus for color television receivers and similar imaging devices.

2. Description of the prior art

Conventional video signal processors add a reference signal to the blanking period of the video signal, and then detect the reference signal to control feedback for high precision white balance adjustment, or detect the cathode current for automatic cut-off adjustment. One automatic white balance adjustment circuit using this method has been proposed in Japanese patent laid-open No. Sho 62-48891.

FIG. 13 is a block diagram of a conventional video signal processor. As shown in FIG. 13, this processor comprises a pseudo-pulse generator 78 for generating pseudopulses for drive and cut-off adjustment, a first adding unit 79 for adding the drive adjustment pseudo-pulse to the first line of the video signal, a second adding unit 80 for adding the cut-off adjustment pseudo-pulse to the last line of the video signal, a contrast and drive adjustment means 81 for controlling the video signal gain and adjusting the contrast and drive, a pedestal clamp video amplifier 82 for amplifying the video signal pedestal clamp and output, a current detector 83 for detecting the cathode current of the cathode ray tube, a first gate 84 that opens at the first line of the video signal, a second gate 85 that opens at the last line of the video signal, a first signal holder 86 for holding the output from the first gate, a second signal holder 87 for holding the output from the second gate, a first comparator 88 for comparing the first signal holder output with a reference voltage 90, and a second comparator 89 for comparing the second signal holder output with a reference voltage 91.

The operation of this video signal processor is described below starting with the contrast and drive adjustment operations.

The drive adjustment pseudo-pulse added to the first line of the video signal by the adding unit 79 is detected by the current detector 83 and first gate 84, and the resulting output is held by the first signal holder 86 for one vertical scanning period (1 V). The hold output is then compared with the reference voltage 90 by the first comparator 88. The first comparator 88 output is defined as an error voltage, and the gain of the contrast and drive adjustment means 81 is controlled so that this error voltage becomes zero (0).

The cut-off is adjusted as follows. The cut-off adjustment pseudo-pulse added to the last line of the video signal by the adding unit 80 is detected by the current detector 83 and second gate 85, and the resulting output is held by the second signal holder 87 for one vertical scanning period (1 V). The hold output is then compared with the reference voltage 91 by the second comparator 89. The second comparator 89 output is defined as an error voltage, and the pedestal clamp video amplifier 82 is controlled so that this error voltage becomes zero (0).

It is thus possible as described above to achieve stable contrast and cut-off control, and thus achieve a stable video signal processor, by means of feedback loop control whereby the voltage values of the drive adjustment pseudo-pulse and cut-off adjustment pseudo-pulse are maintained at a constant reference voltage.

In a conventional video signal processor as described above, the frequency characteristics and linearity deteriorate, and image chromaticity changes, according to the DC level setting because the gain and DC level are controlled and drive and cut-off adjustment are based on the video signal applied to the cathode. It is also necessary to increase the dynamic range at the video output stage in order to achieve a high amplitude, wide bandwidth signal. This requires a high voltage resistance, high frequency transistor, increasing power consumption and the circuit size, and introducing performance and reliability problems in high amplitude, wide band signal processing.

SUMMARY OF THE INVENTION

Therefore, an object of the present invention is to provide a multimedia-compatible video signal processor, and specifically a video signal processor achieving high stability, high fidelity images with a wide band video signal input.

A video signal processor according to the first embodiment of the invention comprises an adding means for adding a brightness reference signal symmetrically with reference to the black level in the vertical blanking period of the input video signal, a control means for applying the signal added by the adding means to the first electrode of the cathode ray tube (CRT), and detecting the current of the brightness reference signal from the added signal to control the current potential, and a second signal applying means for applying the current potential controlled by the control means to the second electrode of the CRT. The invention thus comprised can separately drive the high amplitude, wide band video signal at the first CRT electrode and the brightness control signal at the second CRT electrode, and can achieve a high amplitude, wide band signal applied to the first CRT electrode.

A video signal processor according to the second embodiment of the invention comprises an adding means for adding a brightness reference signal and contrast reference signal in the vertical blanking period of the input video signal, a first control means for referencing the black level to extract the contrast reference signal added by the adding means for contrast feedback control, a first signal applying means for applying the signal from the first control means to the first CRT electrode, a control means for detecting the current of the brightness reference signal from the first control means output signal to control the current potential, and a second signal applying means for applying the current potential from the control means to the second electrode of the CRT. The invention thus comprised can achieve high stability, high fidelity signal processing by means of feedback control. Reliable operation of the feedback loop for contrast and brightness control can also be assured with any input video signal, and a high stability video signal processor can thus be achieved.

A video signal processor according to the third embodiment of the invention comprises a correction means for adding a brightness reference signal symmetrically with reference to the black level in the vertical blanking period of the input video signal, and applying gamma and uniformity correction based on this reference signal, a first signal applying means for applying the signal corrected by the correction means to the first CRT electrode, a control means for detecting the current of the brightness reference signal from the corrected signal to control the current potential, and a second signal applying means for applying the current potential from the control means to the second electrode of the CRT. The invention thus comprised can achieve high precision gamma and uniformity correction with good signal tracking by basing the signal correction process on the brightness reference signal added to the vertical blanking period of the input video signal.

BRIEF DESCRIPTION OF THE DRAWINGS

The present invention will become more fully understood from the detailed description given below and the accompanying diagrams wherein:

FIG. 2 is a wave form diagram used to describe the operation of the first embodiment, FIG. 5 is a wave form diagram used to describe the operation of the second embodiment, FIGS. 6a to 6h are wave form diagrams used to describe the contrast control operation of the second embodiment.

DESCRIPTION OF PREFERRED EMBODIMENTS

First Embodiment

The first embodiment of a video signal processor according to the invention is described below with reference to FIG. 1, which is a block diagram of a video signal processor according to the first embodiment.

Figure 1:
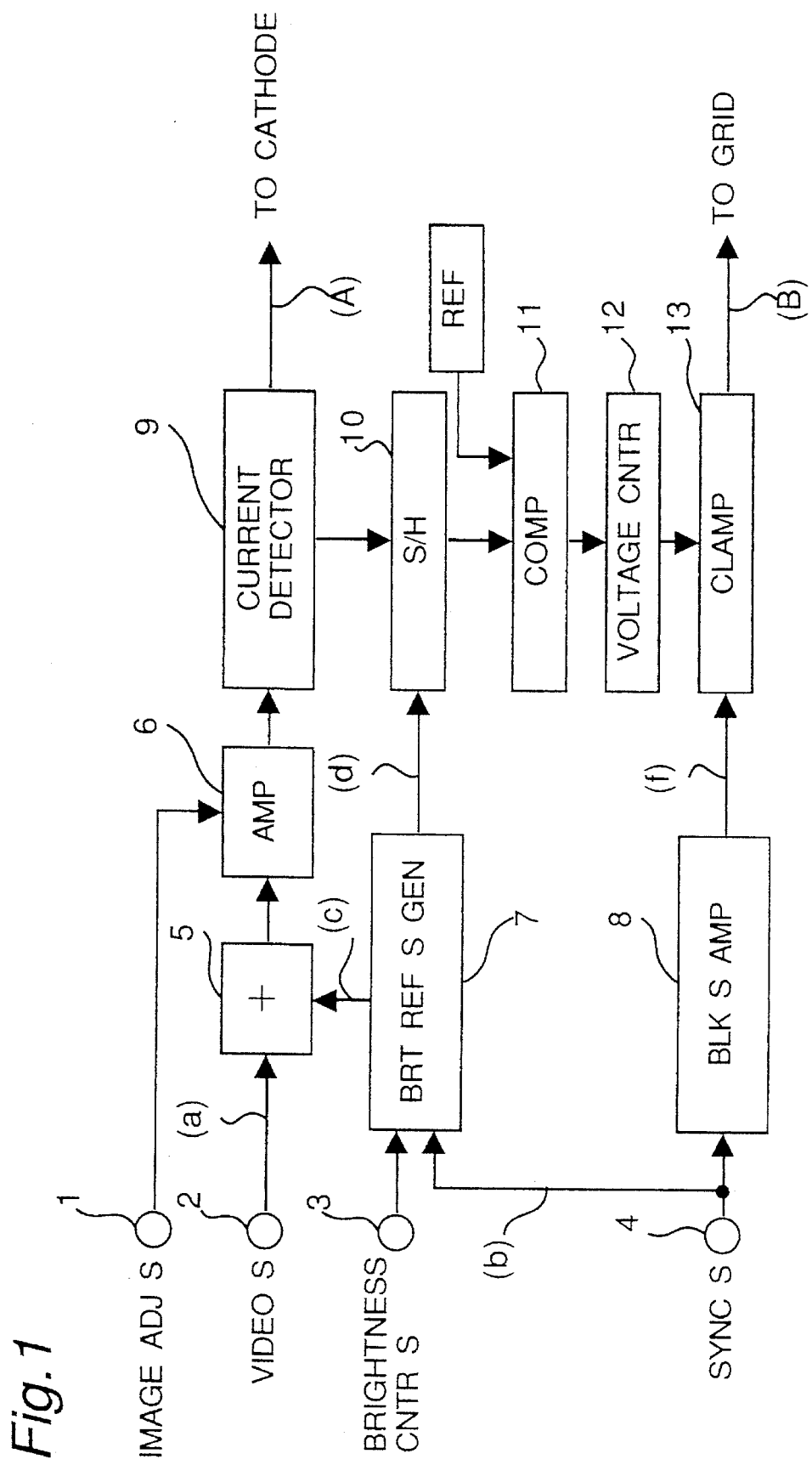
FIG. 1 is a block diagram of a video signal processor according to a first embodiment of the invention.

Referring to FIG. 1, the contrast (CONT below) control signal and other image adjustment signals are input to the input terminal 1, the video signal is input to the video signal input terminal 2, the brightness control signal is input to the brightness control signal input terminal 3, and the synchronization (sync) signal is input to the sync signal input terminal 4. The brightness (BRT) reference signal generator 7 generates the BRT reference signal during the vertical blanking period but offset the vertical fly-back period. The adder 5 adds the BRT reference signal to the video signal. The amplifier 6 adjusts the gain according to the image adjustment signal from the input terminal 1. The current detector 9 detects the cathode current of the BRT reference signal. The sample/hold circuit 10 samples and holds the wave peak of the BRT reference signal based on the timing signal from the BRT reference signal generator 7. The comparator 11 compares the wave peak of the sampled and held BRT reference signal with the black level reference signal to output the amplitude value of the BRT reference signal. The voltage controller 12 controls the current voltage based on the comparator 11 output. The blanking (BLK) signal amplifier 8 generates the blanking signal based on the sync signal from the sync signal input terminal 4. The signal clamp 13 clamps the peak of the BLK signal from the BLK signal amplifier 8 at the control signal from the voltage controller 12.

The operation of a video signal processor thus comprised is described below with reference to the wave form diagram in FIG. 2. The video signal supplied to the video signal input terminal 2 is shown as the FIG. 2 (a) wave, and the vertical sync signal synchronized to the deflection and supplied to the sync signal input terminal 4 is shown as wave (b).

The BRT reference signal generator 7 generates the BRT reference signal (FIG. 2 (c)) during the vertical blanking period of the video signal (FIG. 2 (a)), but offset from the vertical fly-back period of the deflection (FIG. 2 (b)). The wave peak of the BRT reference signal is controlled by the input to the brightness control signal input terminal 3. This is for the current detection of the BRT reference signal to be carried out in a period other than the fly-back period.

The BRT reference signal from the BRT reference signal generator 7 is added to the video signal by the adder 5, resulting in addition of the BRT reference signal as shown by the dotted line in FIG. 2 (a). The signal from the adder 5 is then supplied to the current detector 9 through the amplifier 6. The current detector 9 detects the cathode current of the BRT reference signal added to the video signal vertical blanking period, and applies the cathode current to the first CRT electrode, i.e., the cathode electrode. Current detector 9 detects the current of the BRT reference signal added to the video signal, and produces a voltage signal indicative of the current level. The voltage signal from the current detector 9 is sampled and held by the sample/hold circuit 10 in response to the sample/hold pulse (FIG. 2 (d)).

The sample/hold circuit 10 produces the sampled signal which is supplied to the comparator 11 for comparison with a reference potential, and the comparison result is supplied to the voltage controller 12. The BLK signal amplifier 8 generates the BLK signal containing the horizontal and vertical fly-back periods (FIG. 2 (e)) from the deflection-synchronized sync signal input to the sync signal input terminal 4, amplifies the signal to the voltage VGC required to cut off the cathode, and outputs the BLK signal shown in FIG. 2 (f). The signal clamp 13 clamps the peak of the (FIG. 2 (f)) BLK signal from the BLK signal amplifier 8 to adjust the voltage VGC relatively to the control voltage from the voltage controller 12, and applies the result to the second CRT electrode, i.e., the grid (G1) electrode. Brightness is thus controlled because the peak (VGC) of the BLK signal (FIG. 2 (f)) changes with the BRT reference signal.

The brightness control method is described in detail below with reference to FIG. 3. The voltage signal applied to the cathode terminal of a CRT is shown as waves (A) in FIGS. 3a, 3b, 3c and 3d, and the voltage signal applied to the grid electrode is shown as waves (B) in FIGS. 3a, 3b, 3c and 3d.

Figure 3A:
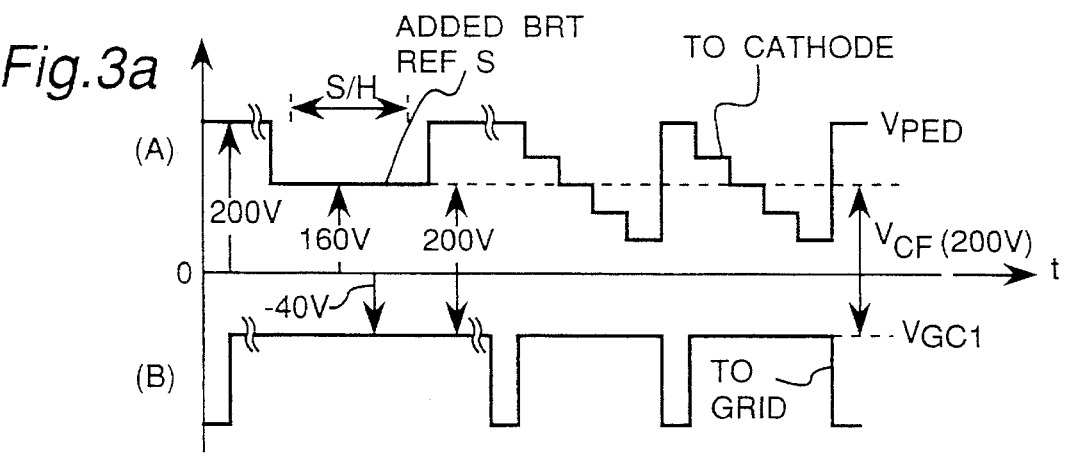
FIGS. 3a to 3d are wave form diagrams used to describe the brightness control operation of the first embodiment.
Figure 3B:
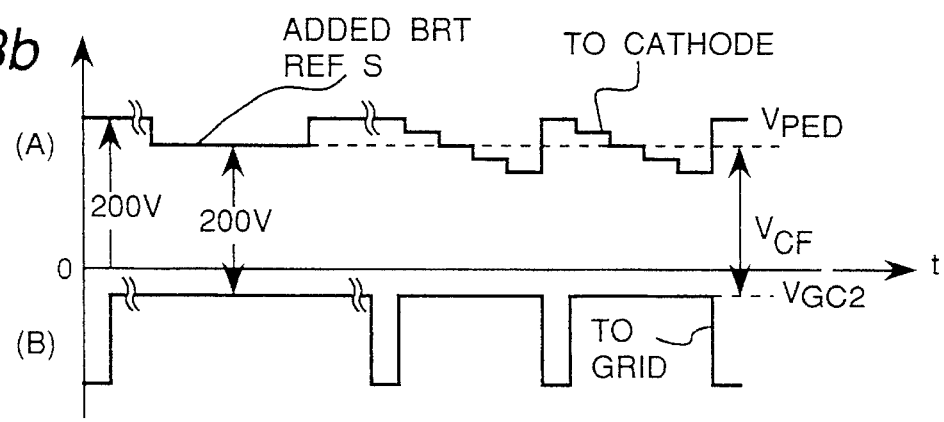
Figure 3C:
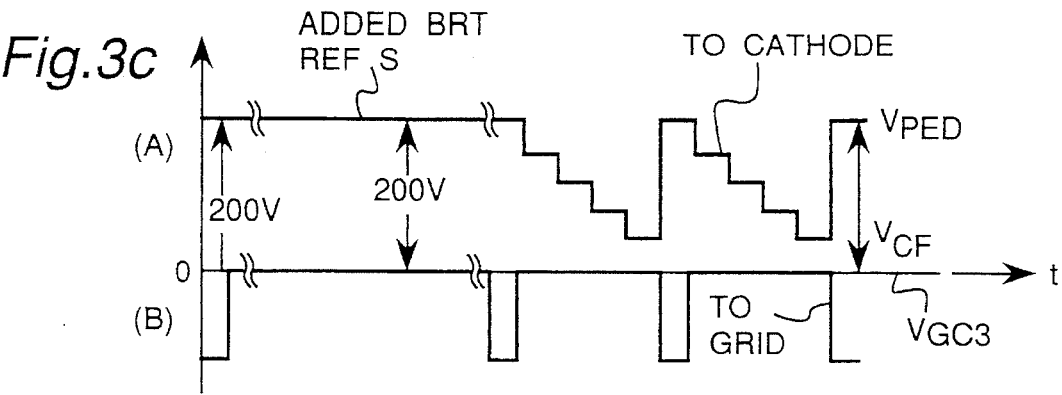

The waves (A) in FIGS. 3a, 3b, 3c and 3d are similar to the wave (a) shown in FIG. 2, but in up-side-down relationship. For example, when a video signal is added with a BRT reference signal shown in FIG. 2 (c), the video signal will have a drooped down portion below the pedestal voltage VPED, i.e., towards the dark side, as shown in FIG. 3a (A). FIGS. 3a, 3b, 3c and 3d show various cases with various levels of the BRT reference signal caused by the change of the brightness control signal. FIG. 3a shows a case when the pedestal level VPED is reduced 40 volts by the addition of the BRT reference signal. FIG. 3b shows a case when the pedestal level VPED is reduced 20 volts by the addition of the BRT reference signal. FIG. 3c shows a case when the pedestal level VPED is maintained the same by the addition of the 0 level BRT reference signal. And, FIG. 3e shows a case when the pedestal level VPED is increased 20 volts by the addition of the BRT reference signal.

The pedestal voltage VPED applied to the cathode is, e.g., 200 volts, as shown in FIGS. 3a, 3b, 3c and 3d, but the current applied to the cathode is several micro amperes. The current detector 9 detects the current flowing to the cathode at the sampling and hold period S/H, and converts the current to a voltage signal (added BRT reference signal) which is relative to, e.g., 1/20 of the voltage applied to the cathode.

For example, in the case of FIG. 3a (A), current detector 9 detects a current to the cathode, e.g., 16 µA, converts the detected current, 16 µA, to a voltage, i.e., 160 volts, and reduces the voltage to a reasonable level, i.e., 8 volts with a predetermined reduction ratio, e.g,. 1/20. The voltage, 8 volts, from the current detector 9 is applied to sample/hold circuit 10 for sampling the 8 volts. Then, in the comparator 11, the sampled voltage, 8 volts, is compared with a reference voltage, e.g., 5 volts, from a reference voltage generator REF. The reference voltage generator REF generates a reference voltage which is commensurate with a predetermined current, e.g., 10 µA, applied to the cathode. In this case, the reference voltage 5 volts indicates that the voltage that can be applied to the cathode by the current of 10 µA is 100 volts (5×20). The difference (8−5=3 volts) produced from the comparator 11 is applied to voltage control 12. The voltage control 12 calculates a cathode voltage (3×20=60 volts) corresponding to the difference (3 volts) and further calculates the necessary clamp voltage VGC1 so that the voltage difference between the voltage of the added BRT reference signal and the clamp voltage VGC1 is equal to a fixed cut off voltage VCF which is from the BRT reference signal peak (FIG. 3a (A)) to the BLK signal peak (VGC1, FIG. 3a (B)) and is, e.g., 200 volts. Thus, in this case, the calculation in voltage control 12 would be as follows.

$$100+60-VGC1=200$$

Thus, $$VGC1=-40$$

Thus, clamp 13 clamps the signal (FIG. 1 (f), FIG. 3a (b)) not to exceed −40 volts. Then, the level-controlled blanking signal (FIG. 3a (B)) is applied to the grid electrode. Thus, the cut off voltage VCF will be fixed to a desired voltage, 200 volts.

Brightness can thus be controlled by applying brightness feedback control to maintain a constant cut-off voltage.

FIG. 3b (A) shows a case in which the signal applied to the cathode is cut in half when compared with the amplitude of the video signal shown in FIG. 3a (A). The grid wave at this time is controlled to be higher than the wave shown in FIG. 3a (B) so that the BLK signal peak VGC2>VGC1 (FIG. 3b (B)).

FIG. 3c (A) shows a case in which the potential at the added BRT reference signal is set to the same level as the pedestal potential. The grid wave at this time (FIG. 3c (B)) is controlled to be higher than the FIG. 3a (B) wave, resulting in a BLK signal peak VGC3 wherein VGC1<VGC3=0.

Figure 3D:
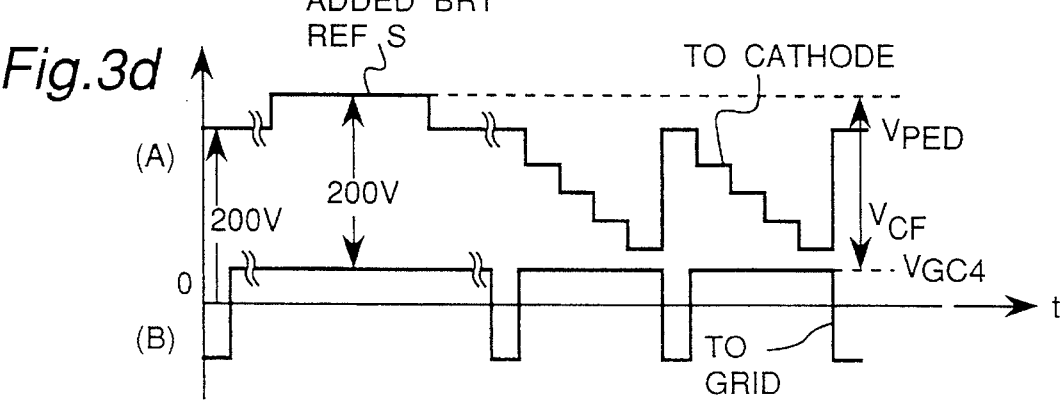
Figure 3E:
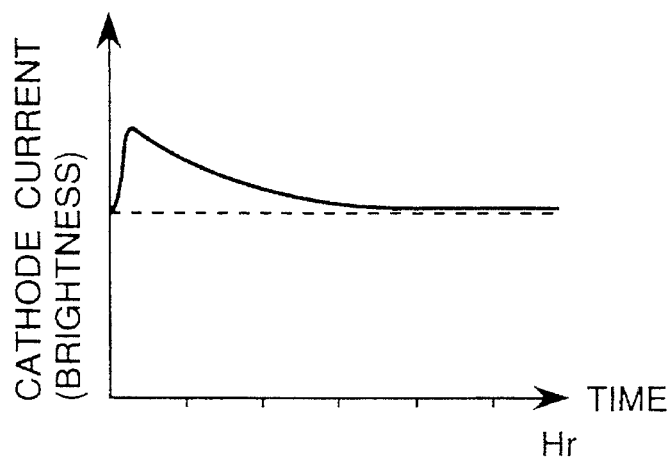
FIGS. 3e to 3g are wave form diagrams showing characteristics of the display device.

FIG. 3d (A) shows a case in which the cathode wave added with the BRT reference signal is raised greater than the pedestal voltage VPED, that is in the brighter direction. The grid wave at this time is controlled to be further higher than the wave shown in FIG. 3d (B) so that the BLK signal peak VGC4 >0>VGC1.

Since the brightness control is carried out by the detection of actual current signal applied to the cathode and using the brightness reference signal added on the pedestal level of the video signal in both directions, i.e., to the bright side and to the dark side, the brightness control operation can be carried out quickly and with high preciseness. In the examples shown in FIGS. 3a to 3d, the signal levels of the added brightness reference signals are shownto be greater in the darker side (downward) and smaller in the brighter side (upward), the limit of such levels can be selected within a reasonable range.

As the brightness control operation was described above with reference to the cathode and grid waves in FIGS. 3a to 3d, the amplifier can easily achieve a high amplitude, wide band signal because just the amplitude of the video signal is controlled based on the cathode wave to maintain a constant pedestal potential. Brightness control can be achieved by means of a simple construction because the grid voltage is controlled rather than controlling the voltage of the cathode which would require a wide band processing. Also, since the change of the cathode current is monitored after every frame, it is possible to automatically suppress the unwanted cathode current deviations caused by the long term use of the CRT and its driving circuit.

Generally, the CRT changes its operation characteristics due to (i) the grid dooming which occurs immediately after the power on by the emission current continuing for a few minutes, resulting in unstableness of the brightness, (ii) the drifting of the cut off voltage VCF after a long term use and (iii) the temperature characteristics of the driving circuit. Because of these factors, according to the prior art television set, as shownby a real line in a graph of FIG. 3e, it has taken one to two hours before the cathode current becomes stable in terms of brightness control. By the employment of the present invention, however, it has taken less than one minutes, as shown by a dotted line in a graph of FIG. 3e, to stabilize the brightness control.

Figure 3F:
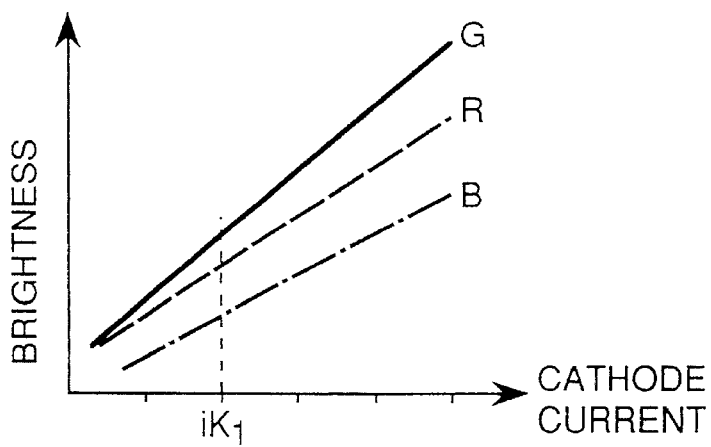
Figure 3G:
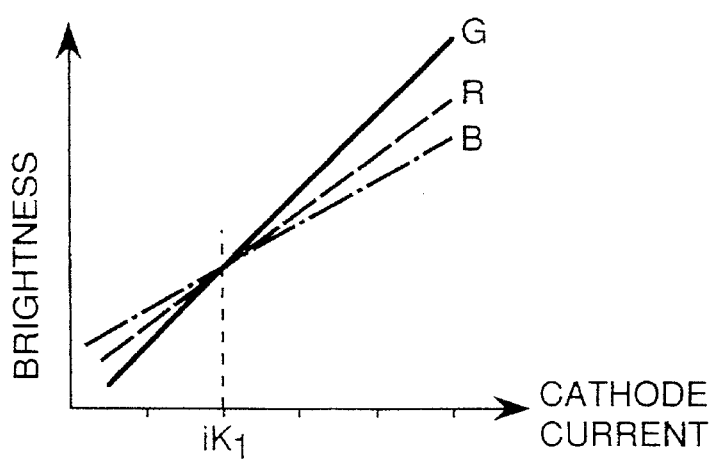

Furthermore, according to the present invention, a current amount iK1 of the added BRT reference signal detected by the current detector 9 is set to be within several µA to several tens µA resulting in slight gleaming light on the screen. Therefore, the brightness of R, G, B colors with respect to the current amount iK1 before the brightness control effected by the present invention is different, as shown in the graph of FIG. 3f, but will be converged after the brightness control effected by the present invention, as shown in the graph of FIG. 3g. Thus, by the brightness control of the present invention, it is possible to provide a constant and stable cut off voltage VCF not only after the brightness control but also other controls such as contrast control.

It is to be noted that the BLK signal applied to the grid electrode is described as the blanking signal in this embodiment to simplify the brightness control operation, but when blanking is applied by the cathode voltage applied to the cathode electrode, the signal applied to the grid electrode is the DC potential.

As described above, a brightness reference signal is added to the video signal blanking period and applied to the first electrode, and the current of the brightness reference signal is detected from the added signal to control the DC potential of the blanking signal applied to the second electrode. It is thus possible to separately drive the high amplitude, wide band video signal at the first electrode and the brightness control signal at the second electrode, thereby easily achieving a high amplitude, wide band signal applied to the first electrode. In addition, reliable operation of the feedback loop for brightness control can be assured with any input video signal, thus achieving a multimedia compatible, high stability video signal processor, and yet correcting the long term use deviation in the characteristics of the CRT and its driving circuit.

Second Embodiment

The second embodiment of a video signal processor according to the invention is described below with reference to FIG. 4.

Figure 4:
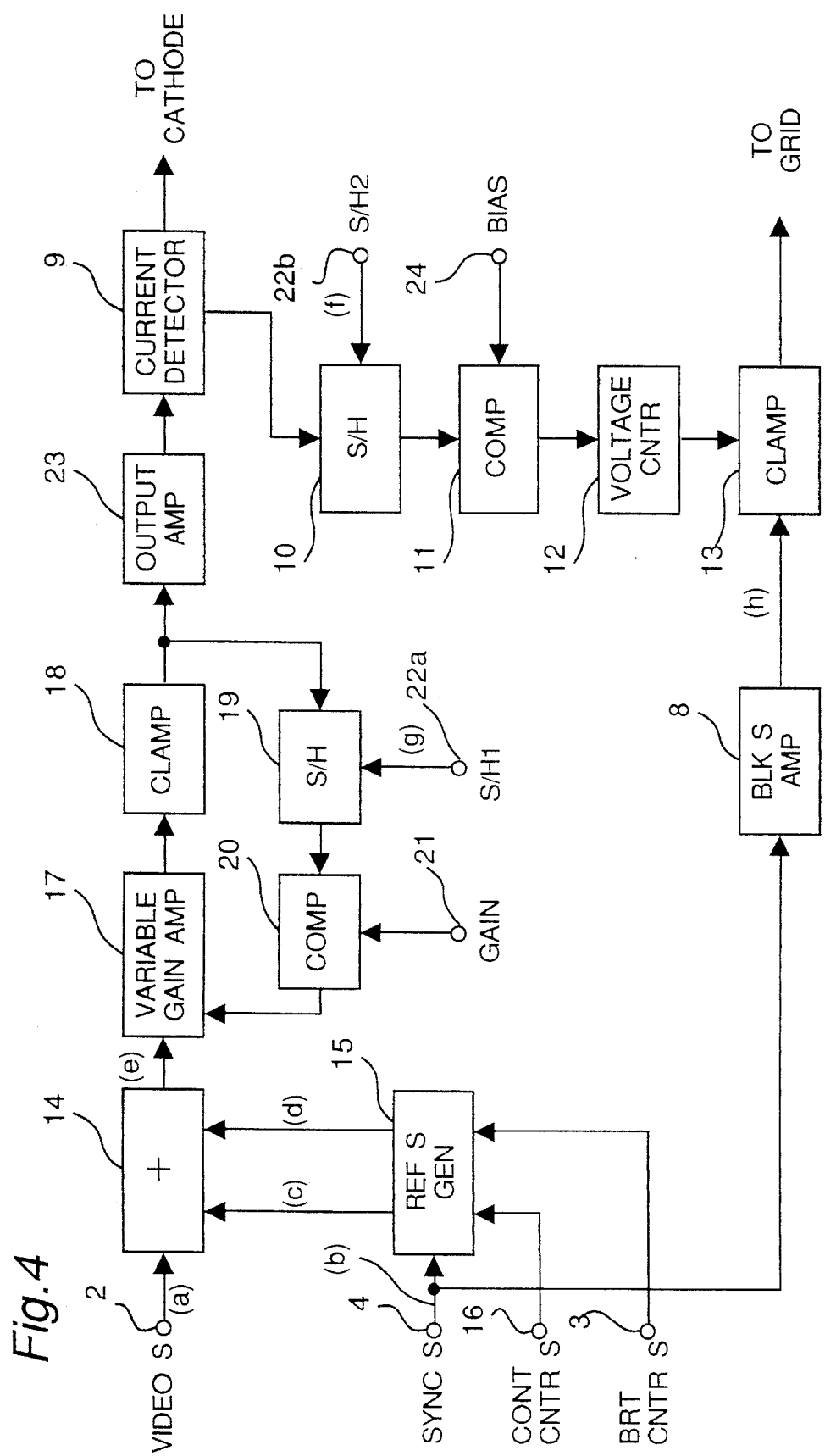
FIG. 4 is a block diagram of a video signal processor according to a second embodiment of the invention.

Referring to FIG. 4, the adder 14 adds the reference signal to the video signal. The reference signal generator 15 generates the brightness (BRT) reference signal and the contrast (CONT) reference signal. The CONT control signal is input to the CONT control signal input terminal 16. The variable gain amplifier 17 varies the gain of the video signal. The clamp 18 clamps the output of variable gain amplifier 17 as a DC signal during the pedestal period of the video signal. The sample/hold circuit 19 samples and holds the peak of the contrast reference signal. The comparator 20 compares the contrast reference signal peak with the black level reference signal, and outputs the amplitude of the contrast reference signal. The GAIN reference potential is input to input terminal 21. The sample/hold pulses 1 and 2 are input to input terminals 22a and 22b, respectively. The output amplifier 23 amplifies the video signal to the level required to drive the CRT cathode. The BIAS reference potential is input to input terminal 24.

Note that components performing like operations in FIGS. 1 and 4 are identified by the same reference numerals, and further description is omitted below.

The operation of a video signal processor thus comprised is described below with reference to the wave form diagram in FIG. 5. The video signal supplied to the video signal input terminal 2 is shown in FIG. 5 (a), and the vertical sync signal synchronized to the deflection supplied to the sync signal input terminal 4 is shown in FIG. 5 (b).

The reference signal generator 15 generates the BRT reference signal (FIG. 5 (c)) during the vertical blanking period of the video signal (FIG. 5 (a)), but offset from the vertical fly-back period (FIG. 5 (b)), and generates the CONT reference signal (FIG. 5 (d)) during the horizontal fly-back period. The wave peak of the BRT reference signal is controlled by the input to the brightness control signal input terminal 3, and the peak of the CONT reference signal is controlled by the control signal from the CONT control signal input terminal 16.

The BRT reference signal and CONT reference signal from the reference signal generator 15 and the video signal are added by the adder 14, which outputs the video signal with the reference signals added as shown in FIG. 5 (e).

The signal from the adder 14 is supplied to the clamp 18 through the variable gain amplifier 17, and the pedestal is clamped during the pedestal period of the video signal. The CONT reference signal level is sampled from the clamp 18 output signal and held by the sample/hold circuit 19 at the sample/hold pulse 1 (S/H1, FIG. 5 (g)), and converted to a DC potential. The signal from the sample/hold circuit 19 is supplied to the comparator 20 for comparison with the GAIN reference potential from the input terminal 21, and the comparison result is supplied to the variable gain amplifier 17 for feedback control of the contrast.

The signal from the clamp 18 is also supplied to the current detector 9 through the output amplifier 23. The current detector 9 detects the cathode current of the BRT reference signal added to the vertical blanking period, and applies the cathode current to the cathode electrode. The BRT reference signal level of the current/voltage converted signal output from the current detector 9 is sampled and held by the sample/hold circuit 10 at the sample/hold pulse 2 (S/H2, FIG. 5 (f)), and converted to a DC potential. The signal from the sample/hold circuit 10 is input to the comparator 11 for comparison with the BIAS reference potential, and the result is supplied to the voltage controller 12.

The BLK signal amplifier 8 generates the BLK signal containing the horizontal and vertical fly-back periods from the deflection-synchronized sync signal input to the sync signal input terminal 4, amplifies the signal to the voltage required to cut off the cathode, and outputs the BLK signal shown in FIG. 5 (h). The signal clamp 13 clamps the peak of the (FIG. 5 (h)) BLK signal from the BLK signal amplifier 8 to adjust the voltage to the control voltage from the voltage controller 12.

The contrast control operation is described in detail below. The peak of the CONT reference signal added as described above is sampled and held by the sample/hold circuit 19 based on the timing signal shown in FIG. 5 (g). The output from the sample/hold circuit 19 and the GAIN reference potential are compared by the comparator 20 to obtain the amplitude of the contrast reference signal. This amplitude value is input to the variable gain amplifier 17 to enable feedback gain control, and the contrast of the video signal is controlled so that the amplitude is equal to a constant reference value. As a result, feedback control is applied so that the CONT reference signal applied to the cathode electrode is always a constant amplitude even when the CONT control signal from the input terminal varies, but the amplitude of the video signal can be changed to control the contrast of the video signal by changing the CONT control signal.

The operating wave of this contrast control process is shown in FIG. 6a to 6f. As shown in FIGS. 6a, 6c and 6e, when the CONT reference signal level is changed and the above feedback control is applied, the output wave of contrast control is as shown in FIGS. 6b, 6d and 6f. In other words, contrast is controlled by using feedback control so that the peak VCONT of the CONT reference signal is constant. In addition, because the changes in the cathode current are monitored, changes in the cathode current resulting from natural changes in the CRT over time are automatically compensated for.

Figure 6I:
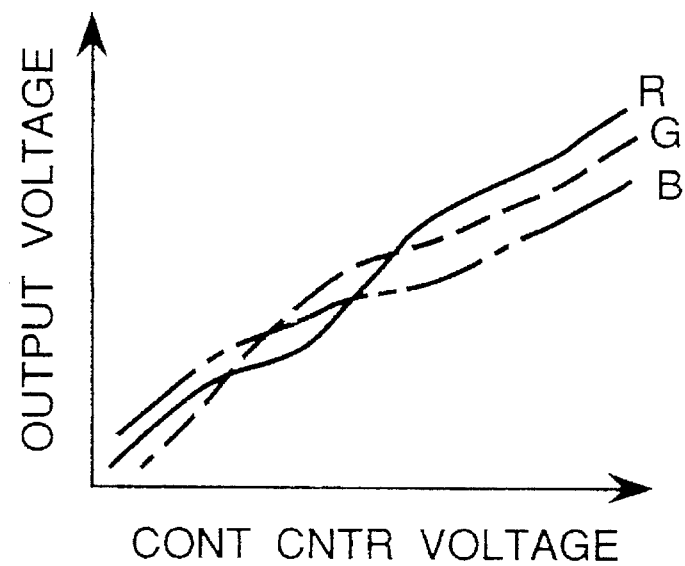
FIGS. 6i and 6j are wave form diagrams showing characteristics of the display device.
Figure 6J:
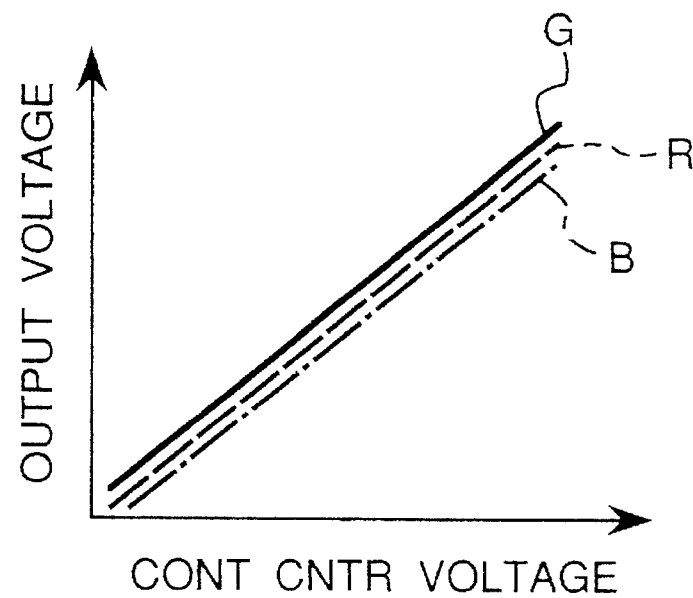

FIGS. 6i and 6j show a relationship between the contrast control voltage of the gain control portion and the output voltage according to the prior art which has no feedback control and the same of the second embodiment, respectively. In the case of prior art, as shown in FIG. 6i, since the output characteristics of R, G, B are not the same, the color balance changes relatively to the change of the contrast control. However, in the case of the second embodiment, as shown in FIG. 6j, since feedback control is applied to the contrast control, the variation of the gain of the gain control portion for difference colors R, G, B are automatically suppressed to have a constant gain. Thus, according to the second embodiment, the contrast control can be carried out while maintaining the output characteristics of R, G, B the same. Thus, color balance among R, G, B will not change even after the contrast control.

The gain G of the variable gain control 17 can be given by the following equation (1)

$$G = VBIAS/VCONT \quad (1)$$

wherein VBIAS is a voltage of the GAIN reference voltage and VCONT is an amplitude of the applied CONT reference signal.

The amplitude of the video signal can be changed by either changing the VBIAS or changing the VCONT. In the second embodiment described above, the contrast control is done by controlling the VCONT, and the drive control of the three colors R, G, B is done by the VBIAS.

It is to be noted that stable feedback control is achieved by adding the BRT reference signal during the vertical blanking period but offset the vertical fly-back period, and by adding the CONT reference signal during the horizontal fly-back period to enable automatic brightness suppression control.

The operation whereby the black level reference signal is added together with the other reference signals by the adder 14 is described below with reference to the wave forms shown in FIGS. 6g and 6h. The black level reference signal is used as the reference signal for detecting the peaks of the contrast and brightness reference signals. The CONT reference signal shown in FIG. 6a and the black level reference signal shown in FIG. 6h are added during the horizontal fly-back period as shown in FIG. 6g. As shown in the black level reference signal periods in the dotted lines in FIGS. 6a to 6f, the level of the black level reference signal is set at the same level as the pedestal level ($V_{PED}$). The CONT reference signal and BRT reference signal peaks are detected referenced to this black level reference signal, and feedback control is applied based on the detection signal.

The contrast control operation is described below.

The sample/hold circuit 19 shown in FIG. 4 includes first and second sample/hold circuits. The first sample/hold circuit samples and holds the level of the added contrast reference signal as described above, and detects the level of the holding signal. The second sample/hold circuit samples and holds the level of the black level reference signal, and detects the level of the holding signal. The gain of the variable gain control 17 is controlled by the use of the amplitude of the contrast reference signal. Therefore, the comparator 20 shown in FIG. 4 also includes first and second comparators. The first comparator compares the two outputs from the first and second sample/hold circuits to obtain an amplitude of the contrast reference signal. The obtained amplitude is then compared in the second comparator with a reference voltage, and the result is used to control the gain of the variable gain control 17 so that the amplitude value equals the reference value, thus maintaining a stable video signal contrast.

The operation of the brightness control is the same as that in the first embodiment, and therefore, the description therefor is omitted.

As described above, the amplitude information of the reference signal is needed to control the contrast i.e., the reference for the black level is required. By adding the image adjustment reference signals with the black level reference signal to the video signal, the image adjustment reference signal peaks and black level reference signal can be reliably sampled and held, and the amplitude information of the image adjustment reference signals can be reliably obtained for any sync signal phase or fly-back period, i.e., for any input video signal. As a result, reliable operation of the feedback loop for contrast and brightness control can be assured, and a high stability video signal processor for multimedia applications can achieved.

Figure 7:
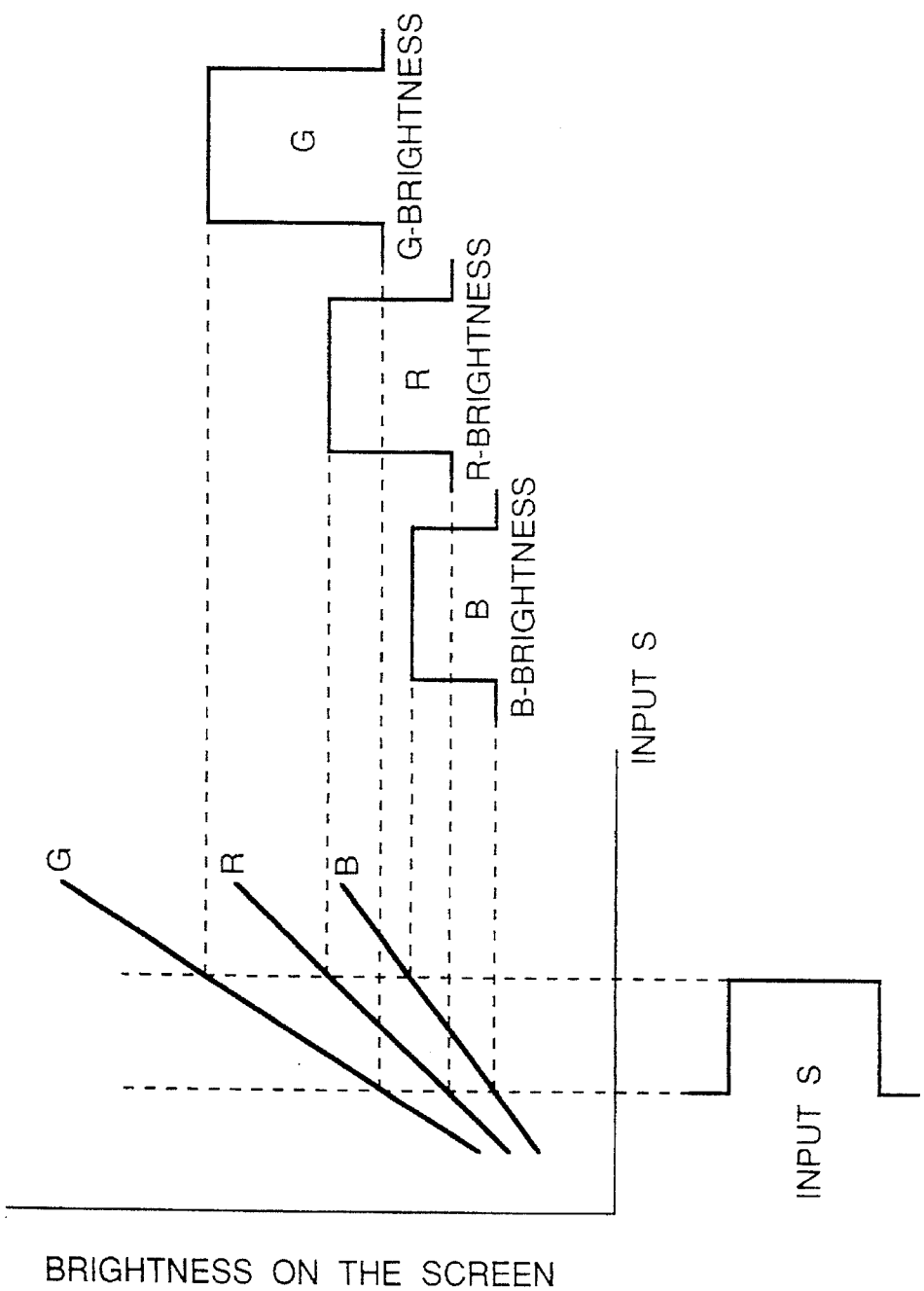
FIG. 7 is a graph used to describe the operation of the second embodiment by showing the relationship between the input signal and the output screen brightness.
Figure 8:
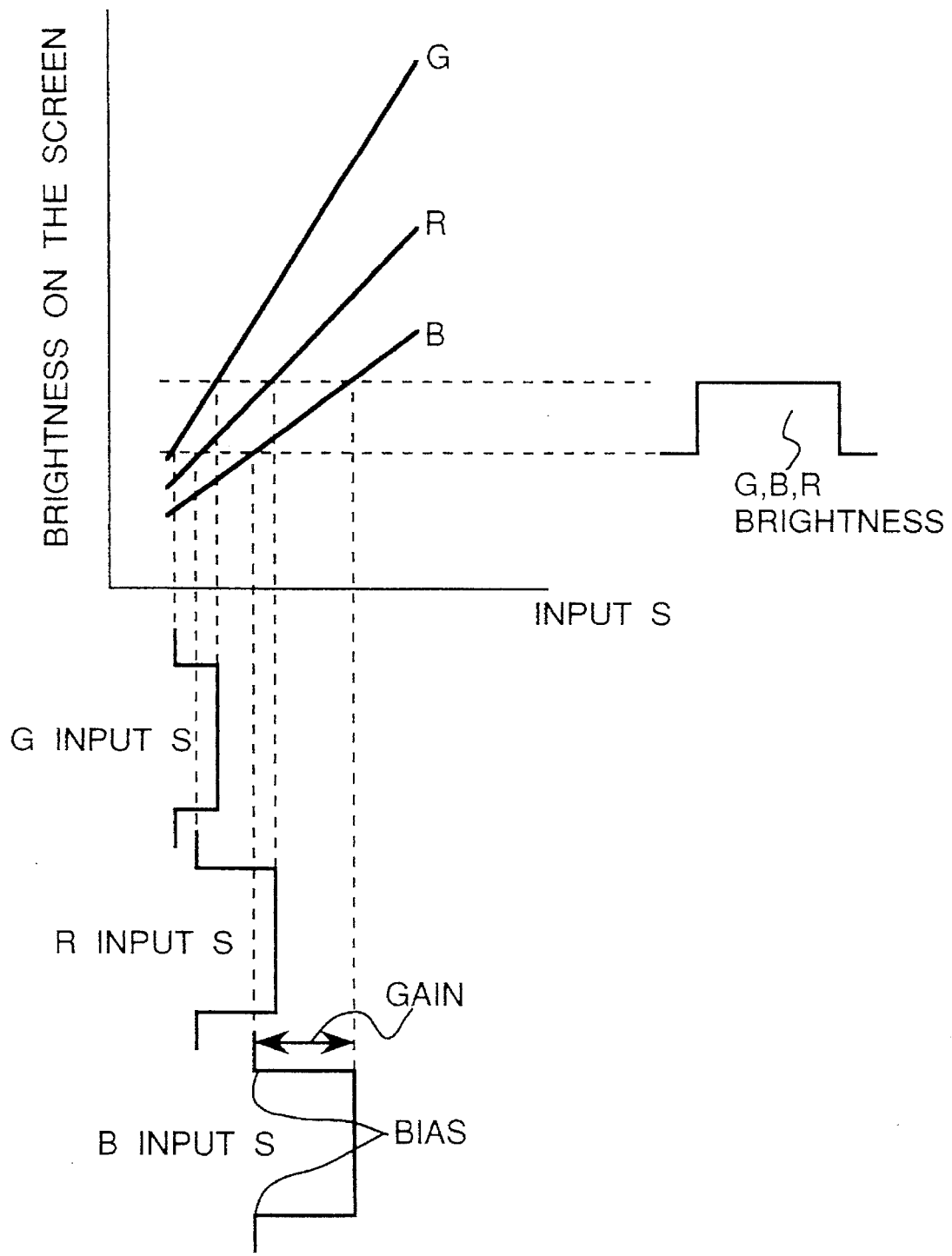
FIG. 8 is a graph of the gain-bias relationship used to describe the operation of the second embodiment.

The white balance adjustment operation is described next. The white balance adjustment is used to compensate for variations in the color balance at each color gradation resulting from the emissions characteristics of the CRT. CRT emissions characteristics are not uniform for red, green and blue, and RGB image brightness values will vary between CRT devices even when the same signal is input because of differences in the relationship between the input signal and the output screen as shown in FIG. 7. It is therefore necessary to adjust the video signal gain and G1 potential for each RGB value, as shown in FIG. 8, to obtain a uniform-display screen brightness. This is the gain and bias adjustment of the white balance adjustment.

In the bias adjustment adjusting near-black low light levels, 0% and 25% black level test signals are emitted, and the white balance of near-black low light levels is adjusted using the BIAS control signal input from input terminal 24. When correcting near-white high light levels in the gain adjustment, 75% and 100% white level signals are emitted, and the near-white white balance is adjusted using the GAIN control signal input from the input terminal 21. A stable feedback control loop is applied to maintain this state until the brightness and contrast control signals are changed.

As thus described, the brightness reference signal and contrast reference signal are added to the blanking period and horizontal fly-back period, respectively, of the video signal, the contrast reference signal is extracted based on the black level for contrast feedback control while applying the signal to the first electrode, and the current of the brightness reference signal is detected from the first applied signal to control the DC potential of the blanking signal applied to the second electrode. The high amplitude, wide band video signal and the brightness control signal can thus be separately driven at the first and second electrodes, respectively, and the amplitude and band width of the signal applied to the first electrode can be easily increased. Reliable operation of the feedback loop for contrast and brightness control can also be assured for any input video signal, and a high stability video signal processor can be achieved.

Third Embodiment

The third embodiment of a video signal processor according to the invention is described below with reference to FIG. 9, which is a block diagram of a video signal processor according to this embodiment.

Figure 9:
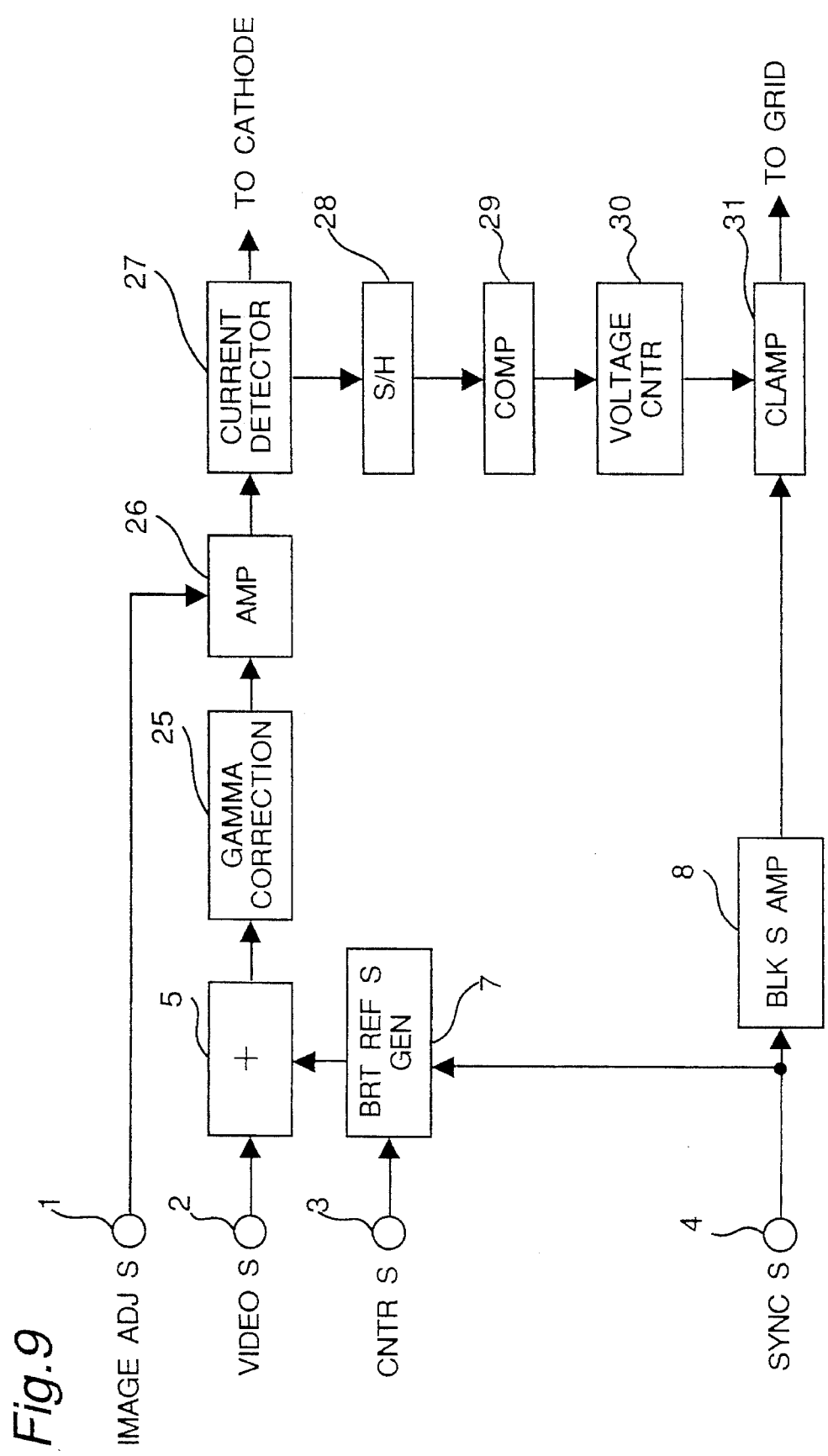
FIG. 9 is a block diagram of a video signal processor according to a third embodiment of the invention.

Referring to FIG. 9, the gamma correction operator 25 applies gamma correction based on the BRT reference signal. The amplifier 26 changes the gain based on the image adjustment signal from the input terminal 1. The current detector 27 detects the cathode current of the BRT reference signal. The sample/hold circuit 28 samples and holds the BRT reference signal peak according to the timing signal from the BRT reference signal generator 7. The comparator 29 compares the BRT reference signal peak with the black level reference signal, and outputs the amplitude of the BRT reference signal. The voltage controller 30 controls the DC voltage based on the output from the comparator 29. The clamp 31 clamps the signal peak so that the BLK signal peak is set to the control voltage from the voltage controller 30.

Note that components performing like operations in FIGS. 1 and 9 are identified by the same reference numerals, and further description is omitted below.

The operation of a video signal processor thus comprised is described below with reference to the wave form diagram in FIG. 10. The video signal supplied to the video signal input terminal 2 is shown as the FIG. 10 (a) wave, and the vertical sync signal synchronized to the deflection supplied to the sync signal input terminal 4 is shown as wave (b).

Figure 10:
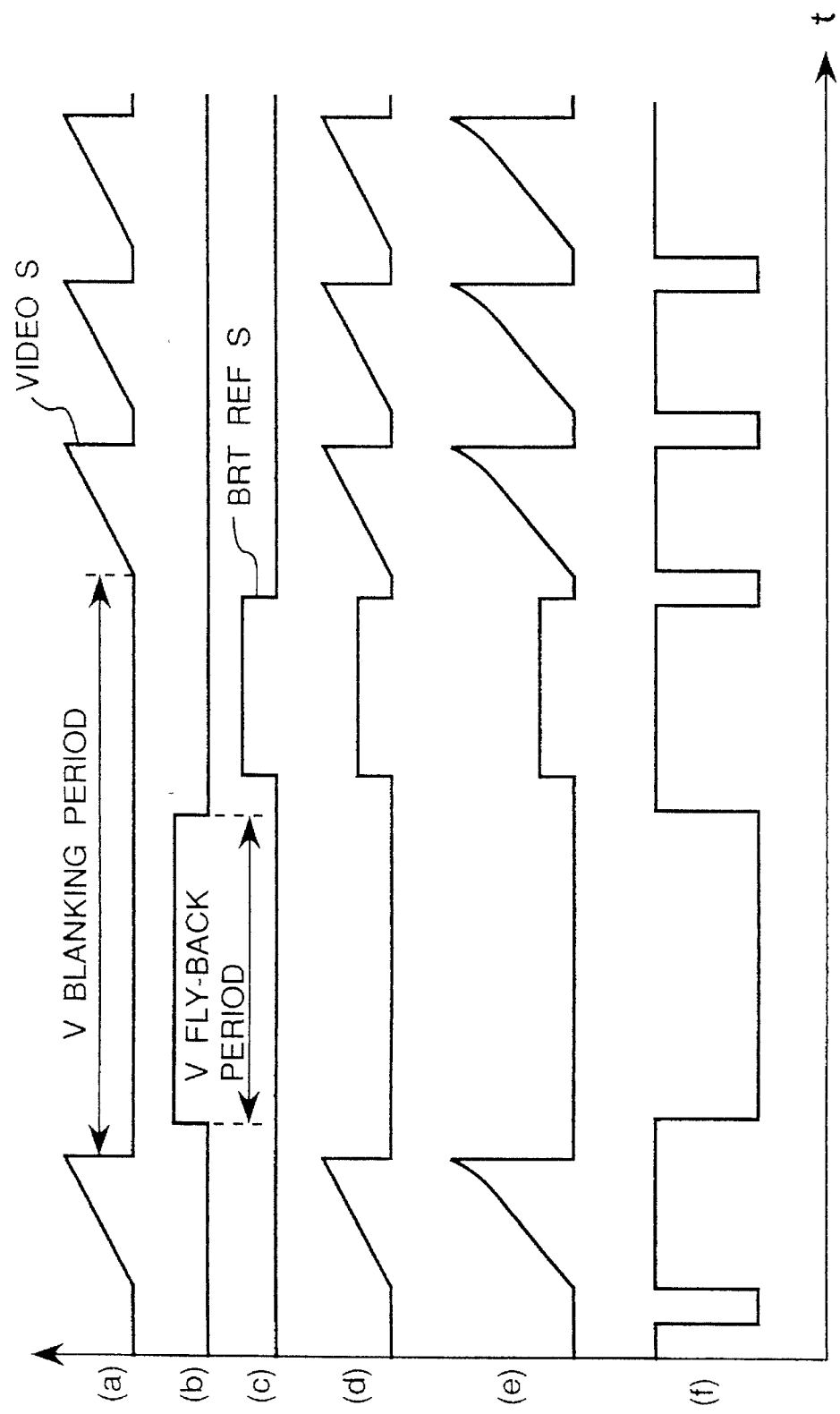
FIG. 10 is a wave form diagram used to describe the operation of the third embodiment.

The BRT reference signal generator 7 generates the BRT reference signal (FIG. 10 (c)) from the vertical blanking period of the video signal (FIG. 10 (a)) and the vertical flyback period of the deflection (FIG. 10 (b)) during a predetermined period outside the vertical fly-back period of the deflection but within the vertical blanking period of the video signal. The peak of the BRT reference signal is controlled by the control signal from the brightness control signal input terminal 3. The BRT reference signal from the BRT reference signal generator 7 is added to the video signal by the adder 5, and the reference signal-added video signal (FIG. 10 (d)) is output. The signal from the adder 5 is supplied to the gamma correction operator 25 and clamped during the BRT reference signal period. Gamma correction is then applied by the gamma correction circuit (not shown in the figures) in the gamma correction operator 25, which is a nonlinear amplifier using the nonlinear characteristics of transistors and diodes. The gamma corrected wave (FIG. 10 (e)) is then output.

The signal from the gamma correction operator 25 is supplied to the amplifier 26, pedestal clamped again during the pedestal period of the video signal, and the signal amplified according to the image adjustment signal from the input terminal 1 is supplied to the current detector 27. The current detector 27 detects the cathode current of the BRT reference signal added to the vertical blanking period, and this cathode current is applied to the cathode electrode. The BRT reference signal level of the current/voltage converted signal from the current detector 27 is sampled and held by the sample/hold circuit 28, and converted to a DC potential. The signal from the sample/hold circuit 28 is input to the comparator 29 for comparison with the reference potential, and the result is output to the voltage controller 30.

The BLK signal amplifier 8 generates the BLK signal containing the horizontal and vertical fly-back periods from the deflection-synchronized sync signal input to the sync signal input terminal 4, amplifies the signal to the voltage required to cut off the cathode, and outputs the BLK signal. The signal clamp 31 clamps the peak of the (FIG. 10 (f)) BLK signal from the BLK signal amplifier 8 to adjust the voltage to the control voltage from the voltage controller 30.

Figure 11:
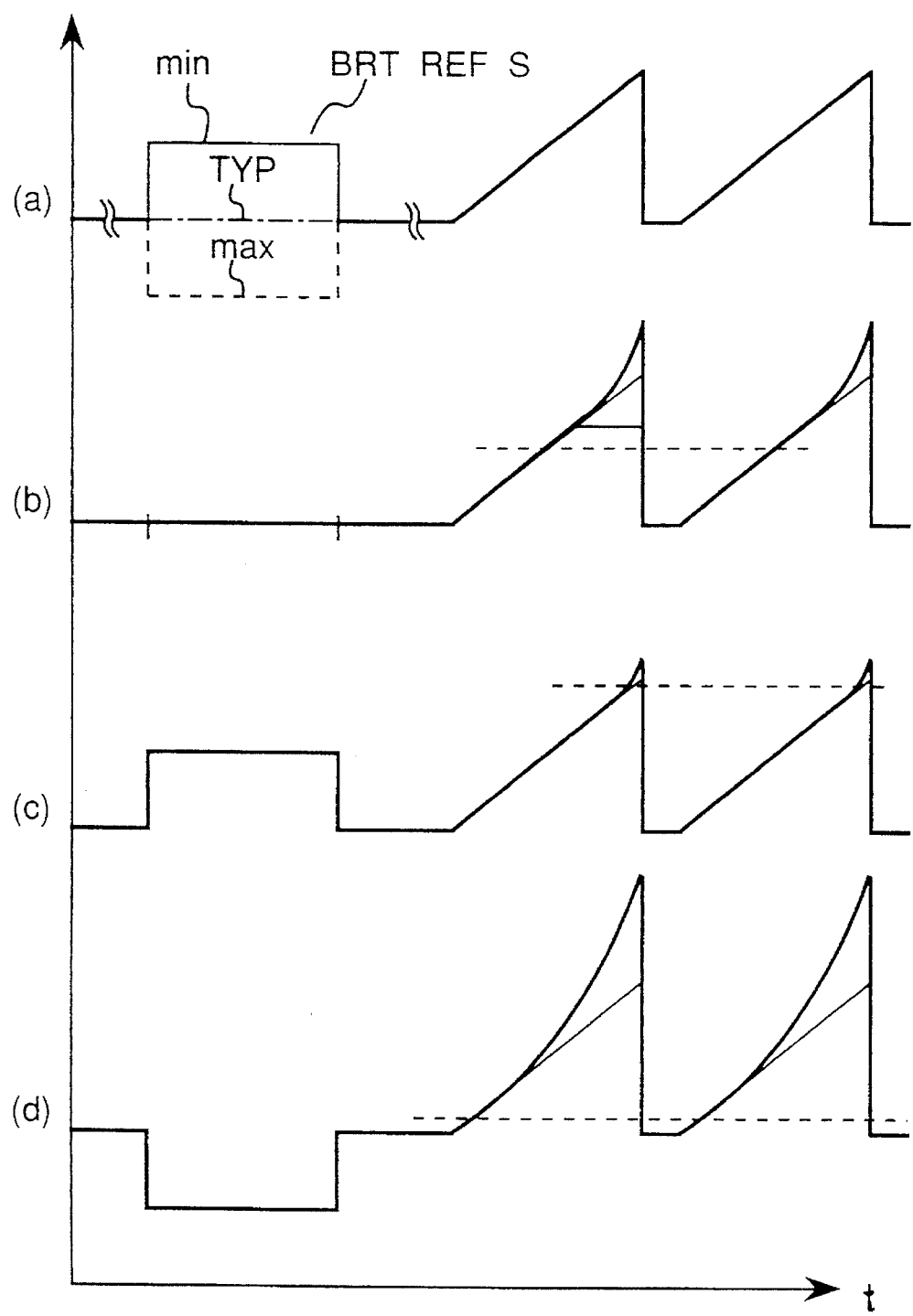
FIG. 11 is a wave form diagram used to describe the gamma correction operation of the third embodiment.

The gamma correction method is described in detail below with reference to FIG. 11. The video signal with the added BRT reference signal and input to the gamma correction operator 25 is shown in FIG. 11 (a). The output characteristics when the BRT reference signal is set to maximum (max), standard (typ), and minimum (min) are shown in FIGS. 11 (b, c, d), respectively. As shown by the ramp output wave when the BRT reference signal is set to standard (typ) conditions (FIG. 11 (b)), nonlinear processing is automatically applied from 50% of the signal mean, but nonlinear processing is applied from 100% of the signal mean when the BRT reference signal is set to minimum (min) conditions (FIG. 11 (c)), and from 0% of the signal mean when the BRT reference signal is set to maximum (max) conditions (FIG. 11 (d)).

Figure 12:
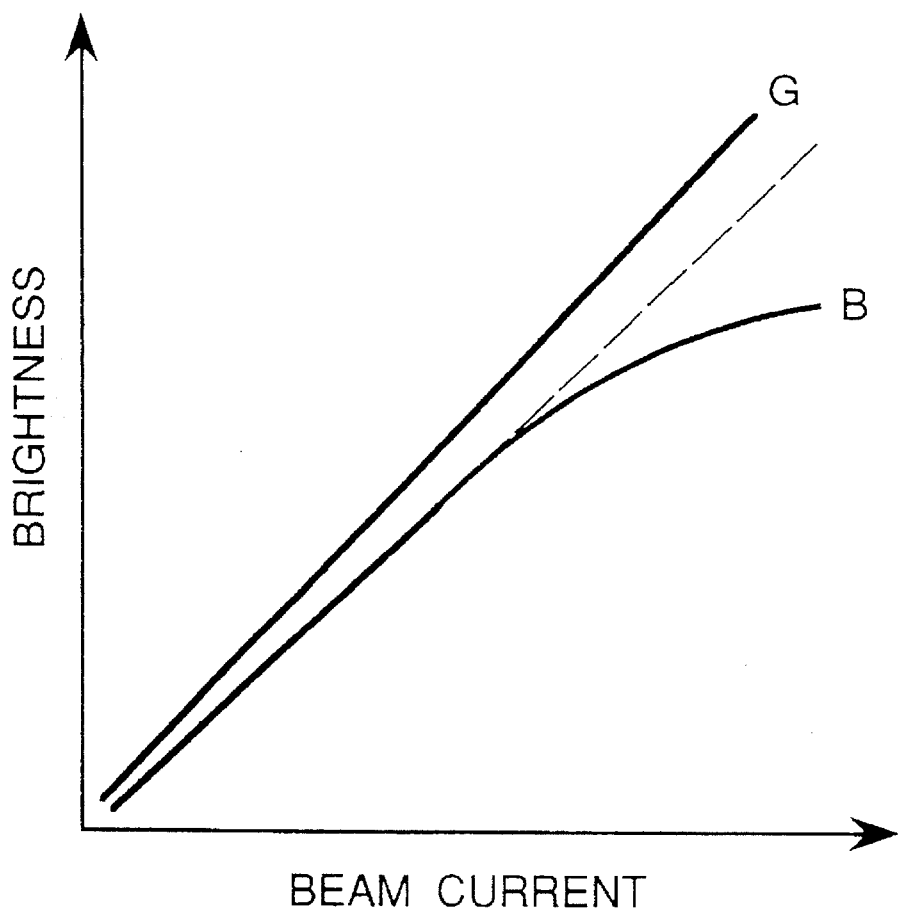
FIG. 12 is a graph used to describe the gamma correction operation of the third embodiment.
Figure 13:
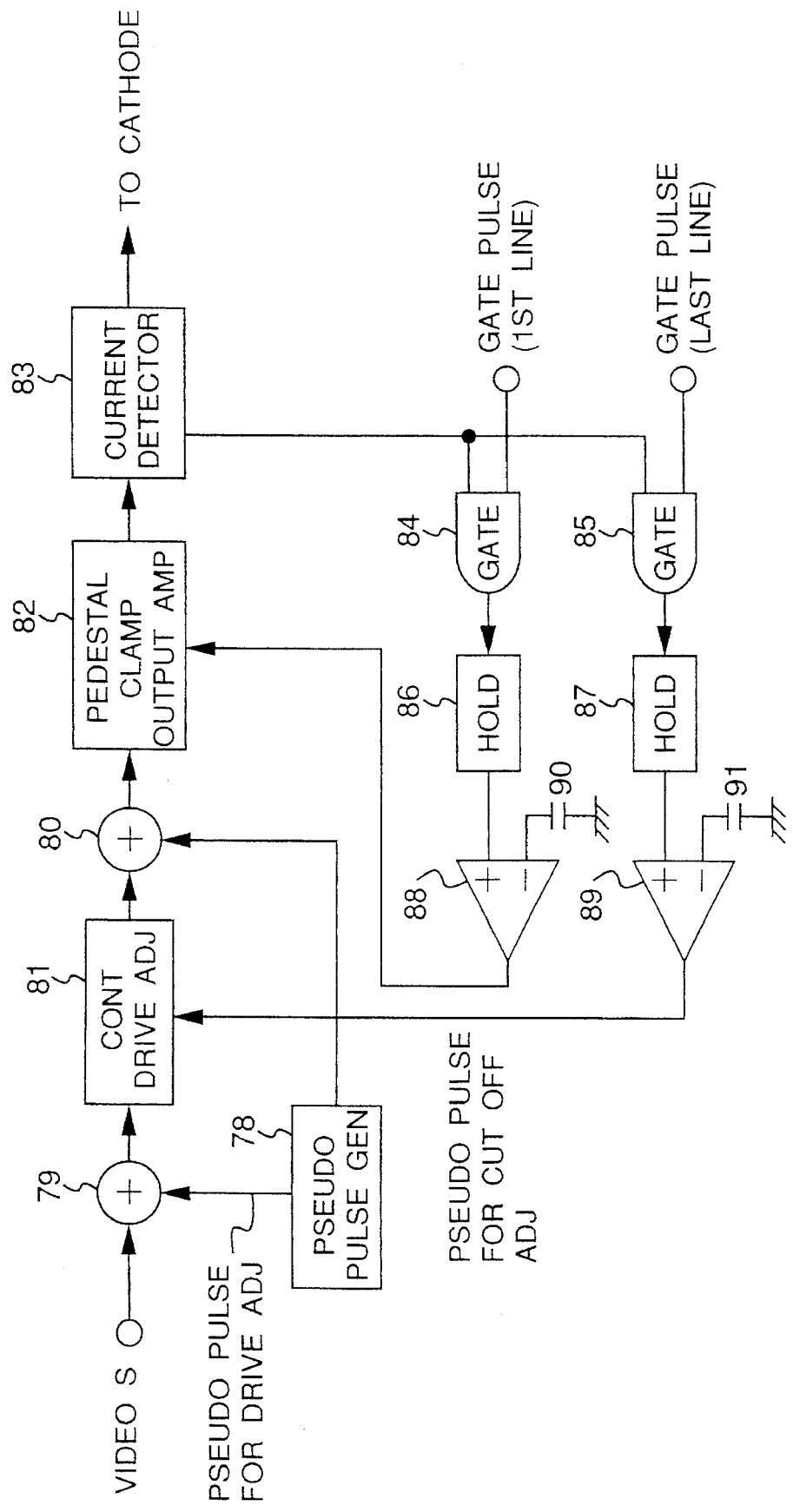
FIG. 13 is a block diagram of a conventional video signal processor.

In other words, high precision gamma correction can be achieved by adding the BRT reference signal to the video signal, and applying gamma correction according to the BRT reference signal level. As shownby the emissions characteristics of a video projector, which uses RGB projectors for a large screen display, in FIG. 12, this is particularly suited to gamma correction when the blue phosphors are saturated at the emissions characteristics of the high current band. This embodiment has been described using gamma correction for signal correction, but uniformity correction correcting color shading and uniformity of the screen brightness will also track the BRT setting conditions.

As described above, nonlinear processing based on the brightness reference signal added to the video signal blanking period is applied and the signal is applied to the first electrode, i.e., the cathode electrode, and the brightness reference signal current is detected to control the DC potential of the blanking signal applied to the second electrode, i.e., the grid electrode (G1). High precision gamma correction is thus possible, it is possible to separately drive the high amplitude, wide band video signal at the first electrode and the brightness control signal at the second electrode, and a high amplitude, wide band signal can easily be applied to the first electrode. In addition, reliable operation of the feedback loop for brightness control can be assured with any input video signal, thus achieving a multimedia compatible, high stability video signal processor.

It is to be noted that the above embodiments of the invention are described with specific application to video signal processing in a color television receiver, but the same process can be applied in other video signal processors. In addition, the reference signals are described as being added to the blanking period, but any other period that does affect the video signal can also be used for adding the reference signals.

In addition, the first and second electrodes in the above embodiments are described as being the cathode electrode and the grid electrode, respectively, of a cathode ray tube, but other electrodes can also be used. In addition, the BLK signal pulse signal is described as applied to the second electrode, i.e., the grid electrode, but a DC potential can be applied if the cathode signal is used for blanking.

In the first embodiment, the video signal is applied to the cathode electrode and the BRT reference signal to the grid electrode, but the reverse is also possible.

Furthermore, in the first embodiment, BRT reference signal is added to the pedestal voltage level (black level) of the video signal, but can be added in other level for obtaining the added BRT reference signal to do the BRT control. Also, the range of the upper and lower limits of the added BRT reference signal can be varied according to the type of display device to which the present invention is applied.

In the second embodiment, the CONT feedback control loop is formed using the signal from the output amplifier input, but the output amplifier output can also be used for the feedback loop.

In the third embodiment, a nonlinear amplifier circuit is used as the gamma correction circuit, but a plural segment approximation circuit can also be used.

Gamma correction in the third embodiment is also accomplished by nonlinear processing, but another type of signal processing correction circuit can also be used.

In video signal processor according to the first embodiment of the invention as described above, a brightness reference signal is added to the video signal blanking period and applied to the first electrode, and the current of the brightness reference signal is detected from the added signal to control the DC potential of the blanking signal applied to the second electrode. It is thus possible to separately drive the high amplitude, wide band video signal at the first electrode and the brightness control signal at the second electrode, thereby easily achieving a high amplitude, wide band signal applied to the first electrode. Also, since the current feedback type control is done by adding the brightness reference signal to the pedestal voltage level (black level) of the video signal, the brightness is controlled using the actual CRT driving signal, thus achieving a high precise BRT control, and yet correcting unwanted deviation in the characteristics of the CRT and its driving circuit caused by the long term use. In addition, reliable operation of the feedback loop for brightness control can be assured with any input video signal, thus achieving a multimedia compatible, high stability video signal processor.

In video signal processor according to the second embodiment of the invention as described above, the brightness reference signal and contrast reference signal are added to the vertical blanking period and fly-back period, respectively, of the video signal, the contrast reference signal is extracted based on the black level for contrast feedback control while applying the signal to the first electrode, and the current of the brightness reference signal is detected from the first applied signal to control the DC potential of the blanking signal applied to the second electrode. The high amplitude, wide band video signal and the brightness control signal can thus be separately driven at the first and second electrodes, respectively, and the amplitude and band width of the signal applied to the first electrode can be easily increased. Reliable operation of the feedback loop for contrast and brightness control can also be assured for any input video signal, and a high stability video signal processor can be achieved.

In addition, by adding the image adjustment reference signals with the black level reference signal to the video signal, the image adjustment reference signal peaks and black level reference signal can be reliably sampled and held, and the amplitude information of the image adjustment reference signals can be reliably obtained for any sync signal phase or blanking period, i.e., for any input video signal. As a result, reliable operation of the feedback loop for contrast and brightness control can be assured, and a high stability video signal processor for multimedia applications can achieved.

In video signal processor according to the third embodiment of the invention as described above, nonlinear processing based on the brightness reference signal added to the video signal blanking period is applied and the signal is applied to the first electrode, i.e., the cathode electrode, and the brightness reference signal current is detected to control the DC potential of the blanking signal applied to the 10 second electrode, i.e., the grid electrode (G1). High precision gamma correction with good signal tracking is thus possible, it is possible to separately drive the high amplitude, wide band video signal at the first electrode and the brightness control signal at the second electrode, and a high amplitude, wide band signal can easily be applied to the first electrode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video signal processor for receiving an input video signal and for controlling a display device having a first electrode and a second electrode, comprising:

generation means for generating, based on a brightness control signal, a brightness reference signal in a range from a positive voltage level to a negative voltage level including a zero voltage level;

adding means for adding the brightness reference signal, which is any one of a positive voltage level, a zero voltage level or a negative voltage level, to a pedestal level in a vertical blanking period of the input video signal, said added brightness reference signal being applied to said first electrode;

detection means for detecting a current of said added brightness reference signal, and for producing a current level signal commensurate with the detected current;

DC potential setting means for setting a DC potential based on said current level signal;

voltage supplying means for supplying a control voltage to said second electrode; and clamping means for clamping a peak of said control voltage to a voltage determined by said DC potential setting means such that a voltage difference between a peak of said added brightness reference signal and said peak of the control voltage is maintained constant.

2. A video signal processor for controlling a display device having a first electrode and a second electrode, comprising:

generation means for generating a brightness reference signal, a contrast reference signal and a black level reference signal and subjecting the contrast and black level reference signals to a blanking process to reach a pedestal potential in a horizontal flyback period;

adding means for adding to an input video signal said brightness reference signal during a vertical blanking period and said contrast reference signal and black level reference signal simultaneously during a horizontal flyback period of the input video signal;

variable gain control means for controlling a level of said added contrast reference signal;

extraction means for extracting said added contrast reference signal;

contrast feedback control means for comparing said extracted contrast reference signal with a predetermined reference potential and feeding back a compared result to said variable gain control means to maintain said added contrast reference signal at predetermined level, said added brightness reference signal and said added contrast reference signal being applied to said first electrode;

detection means for detecting a current of said added brightness reference signal, and for producing a current level signal commensurate with the detected current;

DC potential setting means for setting a DC potential based on said current level signal;

voltage supplying means for supplying a control voltage to said second electrode; and clamping means for clamping a peak of said control voltage to a voltage determined by said DC potential setting means such that a voltage difference between a peak of said added brightness reference signal and said peak of the control voltage is maintained constant.

3. A video signal processor for receiving an input video signal and for controlling a display device having a first electrode and a second electrode, comprising:

generation means for generating, based on a brightness control signal, a brightness reference signal in a range from a positive voltage level to a negative voltage level including a zero voltage level;

adding means for adding the brightness reference signal, which is any one of a positive voltage level, a zero voltage level or a negative voltage level, to a pedestal level in a vertical blanking period of the input video signal, said added brightness reference signal being applied to said first electrode;

correction means for effecting gamma correction applied to said video signal with the added brightness reference signal;

detection means for detecting a current of said added brightness reference signal from said correction means, and for producing a current level signal commensurate with the detected current;

DC potential setting means for setting a DC potential based on said current level signal;

voltage supplying means for supplying a control voltage to said second electrode; and clamping means for clamping a peak of said control voltage to a voltage determined by said DC potential setting means such that a voltage difference between a peak of said added brightness reference signal and said peak of the control voltage is maintained constant.

* * * * *